United States Patent

Thiel

[11] Patent Number: 5,929,406
[45] Date of Patent: Jul. 27, 1999

[54] SAFETY STRIPS FOR CLOSING EDGES

[75] Inventor: Lothar Thiel, Rheinfelden, Germany

[73] Assignee: Wampfler Aktiengesellschaft, Weil Am Rhein-Maerkt, Germany

[21] Appl. No.: 08/966,749

[22] Filed: Oct. 10, 1997

[30] Foreign Application Priority Data

Nov. 19, 1996 [DE] Germany ............... 196 47 720

[51] Int. Cl.$^6$ ................................. H01H 3/16
[52] U.S. Cl. ........................... 200/61.43; 200/61.73; 200/85 R; 49/27
[58] Field of Search ............ 49/26–28; 200/61.41–61.44, 200/61.62, 61.71, 61.73, 61.74, 61.81, 85 R, 86 R, 85 A

[56] References Cited

U.S. PATENT DOCUMENTS

| 3,761,658 | 9/1973 | Loose et al. ............... 200/85 R |
| 3,894,206 | 7/1975 | Suzuki et al. ............... 200/85 A |
| 4,045,631 | 8/1977 | Dann ........................... 200/61.43 |
| 4,301,621 | 11/1981 | Houweling .................. 49/27 |
| 4,349,710 | 9/1982 | Miller ......................... 200/61.43 |
| 4,987,277 | 1/1991 | Duhon ......................... 200/86 R |

FOREIGN PATENT DOCUMENTS

| 0 103 726 B1 | 10/1986 | European Pat. Off. ......... E05F 15/00 |
| 04 21 048 A1 | 4/1991 | European Pat. Off. ......... E05F 15/00 |
| 84 13 835 U1 | 10/1984 | Germany ...................... E05F 15/20 |
| 36 06 499 C1 | 7/1987 | Germany ...................... F16P 3/12 |

Primary Examiner—Michael A Friedhofer
Attorney, Agent, or Firm—Pollock, Vande Sande & Amernick

[57] ABSTRACT

A safety strip for use on moving devices with the danger of pinching has a plurality of contact elements assembled into a row under an axial prestress along the safety strip. Extending in these contact elements are electrically conductive contact pins that, in the off, i.e. non-operate state maintain a circuit through the adjacent contact elements by contact and in the event that the safety strip is deformed through some external force open the circuit through the spatial distance from each other. The axial prestress and control of the individual contact elements is effected by means of an elastic tubing. However, in the present state-of-the-art, such safety strips result in a high material load in the area of the contact zones between the individual contact elements and, in addition, have only a limited maintainability. This problem is overcome by generating the prestress through individual tubing pieces that, in alternating sequence, overlay two contact elements and press the overlapping contact elements against each other.

12 Claims, 3 Drawing Sheets

Components of a design of the safety strip and its assembly in longitudinal section Fig. 1. Components of a design of the safety strip and its assembly in longitudinal section Fig. 2. Another design of a safety strip in longitudinal section Fig. 3. The safety strip shown in Fig. 2 in switch state Fig. 4. A third design of a safety strip with screw connection Fig. 5. The safety strip shown in Fig. 4 in switch state

SAFETY STRIPS FOR CLOSING EDGES

FIELD OF THE INVENTION

The invention relates to a safety strip that can be attached to the abutting edges of moving devices such as power operated doors. One such safety strip has a multitude of contact elements aligned along the safety strip and pressed together by axial prestressing. Such safety strips are designed to prevent pinching in moving devices as, for example, automatic vehicle garage doors, to stop contact with obstacles and to cause movement of the door in the opposite direction thereby preventing damage or injury.

BACKGROUND OF THE INVENTION

Those skilled in the art are familiar with safety strips such as those disclosed in EP 0 103 726, comprising flexible tubing and the contact elements surrounded thereby. In such devices, the axial prestress ensures that the contact elements make continuous contact with each other in the quiescent condition, is created by tubing which surrounds the contact elements. In addition, the contact elements are interconnected to the tubing by some force or material.

The load on the tubing between the contact elements in such arrangements presents a problem. Longitudinal fluctuations caused by temperature changes, as well as the action of the safety strip produce considerable local stress variations.

Furthermore, although high axial prestressing effects contact between the individual switching elements and thus is desirable, this inevitably results in a lessening of the safety strip's switching sensitivity since the required bending force to stop movement likewise increases.

An additional problem consists in the variations in the prestress since the E-module of the tubing changes depending on temperature and aging.

The object of the invention therefore is the development of a substantively maintenance-free safety strip providing improved switching safety and a longer service life.

BRIEF DESCRIPTION OF THE DRAWING(S)

Some exemplary embodiments of the invention are described in greater detail below with reference to the accompanying figures in which.

DETAILED DESCRIPTION OF THE PREFERRED EMBODIMENT(S)

Figure 1:
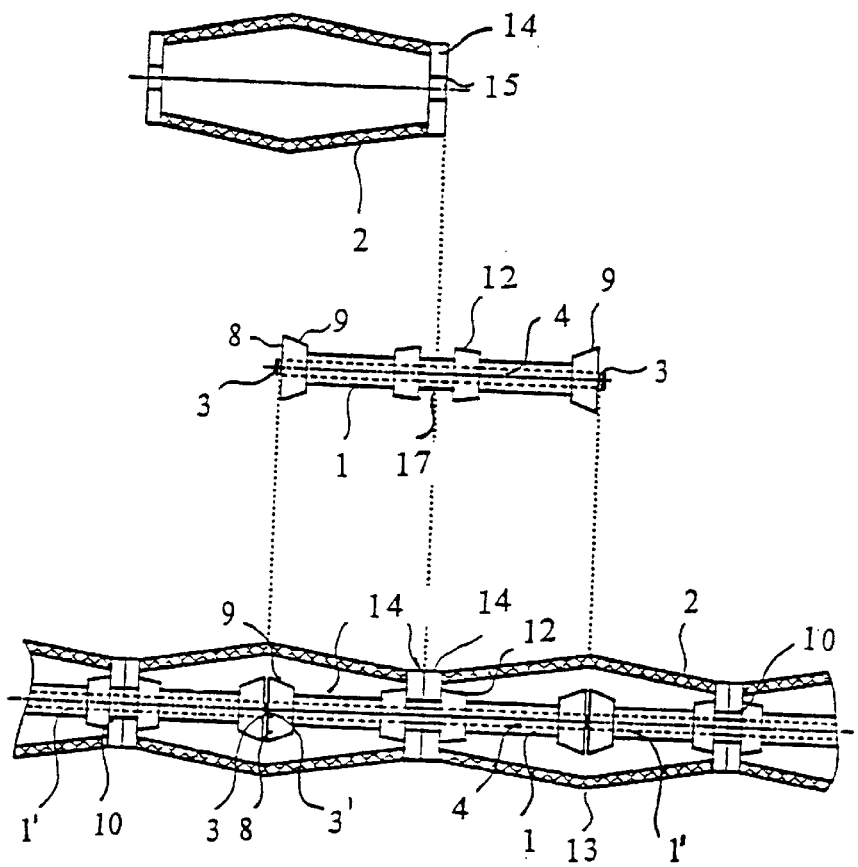
FIG. 1 illustrates a safety strip and its assembly in longitudinal section.

FIG. 1 shows a length of a resilient tubing 2 and a contact element 1. The reciprocal rows of these components reflect the represented safety strip switching device.

Contact element 1 is essentially cylindrical and is formed of an electrically non-conductive material. Contact element 1 has beads 9 on its ends on which tilt zones 8 are supported. In the vicinity of its axial midpoint it has two rotatable beads 12. Along its center axis, contact element 1 has a metal pin 4 that projects at both ends, thereby forming contact zones 3.

Tubing element 2 consists of an approximately cylindrical elastic section of tubing with a diameter increasing axially toward its center. It is closed at both ends with disks 14. Disk 14 has a borehole 15 at its midpoint whose diameter substantially corresponds to the diameter 17 of the contact element 1.

In constructing the safety strip, the contact elements are arranged so that their axial center line runs along the center line of the safety strip, and contact zones 3 are each adjacent to contact zone 3 of the next contact element 1'. Tubing elements 2 are arranged so that each overlaps two contact elements 1 and 1'. The zone of extended tubing diameter 13 is situated over bead 9 of the contact element. Disks 14 of tubing 2 are positioned between beads 12 in the center region of contact element 1.

In the quiescent condition, the contact elements lie coaxially in rows next to each other and establish an electrically conductive connection to the respective adjacent element 1' through contact zones 3, and consequently over the entire safety strip. By virtue of the intervention of disks 14 in bead 12, the individual contact elements are held and prestressed by tubing elements 2.

The extended range 13 of tubing pieces 2 facilitates a simple fitting together of contact elements 1 since, by pressing it together, it very simply effects a lengthening of the tubing and thus invokes the desired prestressing upon assuming its initial form.

When the safety strip of the present invention, due to lateral pressure, is bent away from its quiescent condition, contact elements 1 in tilt zones 8 of bead 9 tilt so that contact zones 3,3' of the two adjacent contact elements separate from each other with the result that the circuit is interrupted. In the process, the entire affected tubing piece 2 becomes elastically deformed causing the material to divide. Similarly, the extension 13 of the tubing facilitates the required freedom of movement of the contact elements.

The thickness of bead 9 in the area of tilt zone 8 determines the requisite displacement path of the contact elements required to break the contact.

The switching devices are characterized by equal tubing piece loads; by locally determined variations in tubing form, thickness, and material, by adjustable prestressing; as well as simple maintenance resulting from the interchangeability of individual tubing pieces on the spot.

Figure 2:
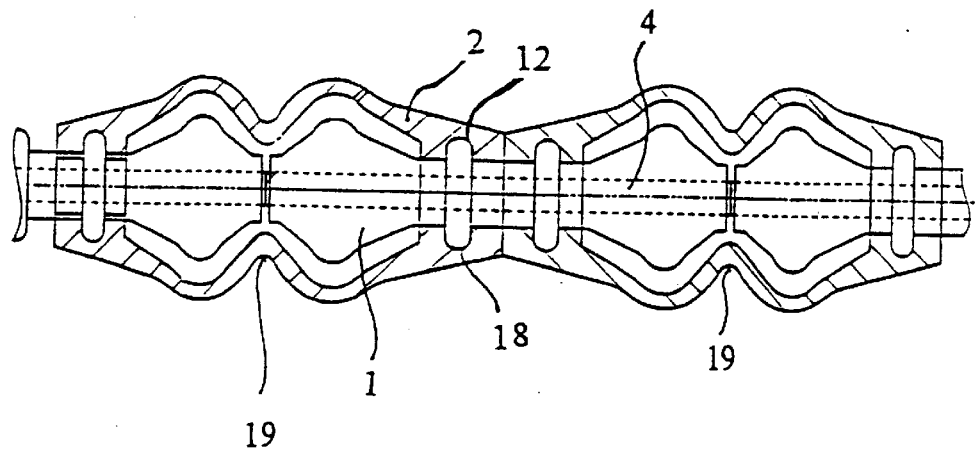
FIG. 2 illustrates another design of a safety strip in longitudinal section.

FIG. 2 shows a different configuration in which tubing pieces 2 have, instead of a disk 15, a contracted inner diameter with an encircling annular groove. The outer diameter of tubing pieces 2 of this configuration likewise increases axially to the center, although in the center it, too, has a contraction 19 in order to be able to control a bending movement at this specific place.

Contact elements 1 follow the tubing contour to keep the distance between contact element 1 and tubing piece 2 as close as possible.

Contact elements 1, and tubing pieces 2, merge by locking an encircling bead 12 on contact elements 1 on an encircling annular groove in tubing pieces 2.

Figure 3:
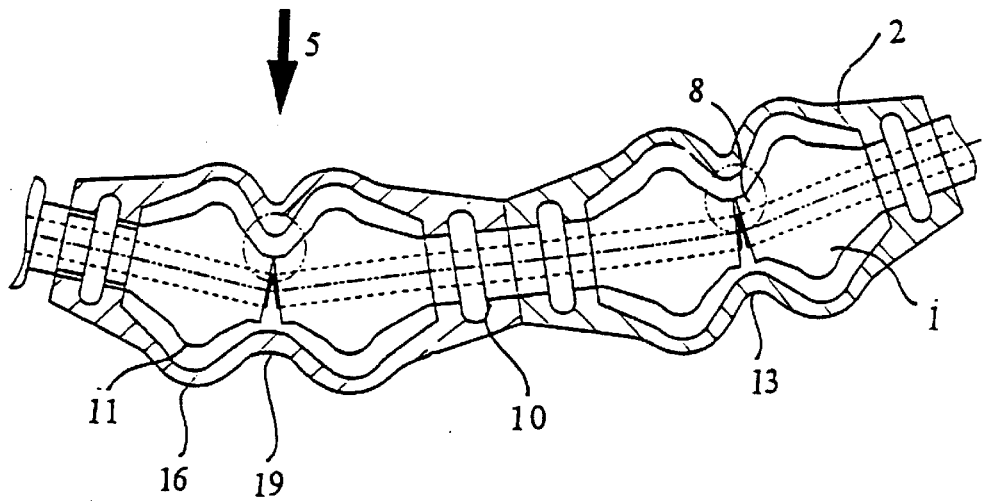
FIG. 3 illustrates the safety strip of FIG. 2 in a switch state.

If an external force 5, as represented in FIG. 3, were to act transversely on the safety strip, then contact elements 1 would be pushed out of their normal condition. In the process, contact elements would be snapped off from contact elements 1 of the adjacent elements 1' in tilt zone 8. While the corners of the nonconducting tilt zone 8 are pressed against each other, the metal pins 4 in contact elements 1 become spatially separated from each other. This results in a break in the electrical contact and therefore a cut-off through the safety strip.

The contraction of the tubing diameter in the area of the contact zones between adjacent contact elements 1 serves as a predetermined bend spot.

Figure 4:
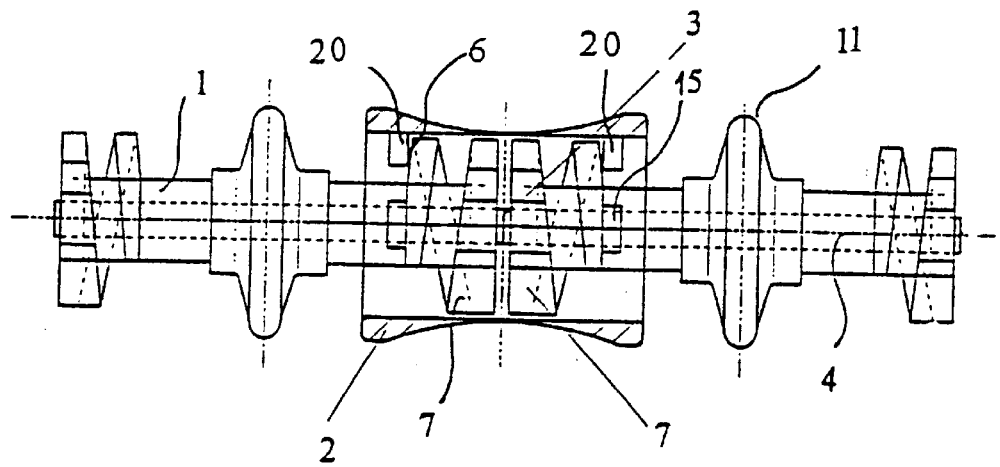
FIG. 4 illustrates a third design of a safety strip with a screw connection.

FIG. 4 shows tubing pieces in which contact elements 1 are screwed into their ends. For this purpose, the ends of contact elements 1 have a thread 7 that runs concentrically to the longitudinal axis. At the end of its last thread it has a recess 15 on its inside, leading to both outlet sides, and tubing piece 2 has a spike 20. In the center of contact element 1 is a distance disk 11, having a diameter similar to the outer diameter of tubing piece 2.

To assemble the safety strip, contact elements 1 are screwed with their thread 7 over screw-in spike 6 into the tubing pieces. Recess 15, at the last thread wind, prevents the development of an unreliably high axial prestress by screwing in too deeply.

Other kinds of screwing operations are feasible as, for example, threads on the tubing pieces, and on the contact elements, or an additional screw stuck through a hole in the tubing pieces and screwed to the respective contact element.

Figure 5:
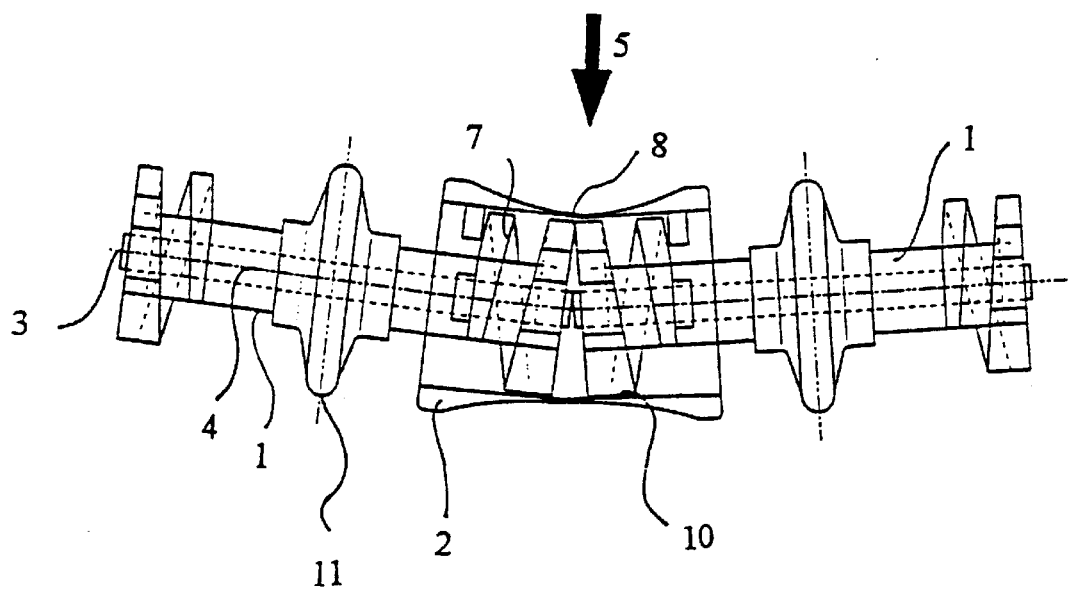
FIG. 5 illustrates the safety strip shown in FIG. 4 in a switch state.

In the case of a lateral displacement by force 5 (see FIG. 5), contact elements 1 in this configuration likewise are tilted in tilt zones 8. Distance disk 11 serves, in this case, to effect an even transmission of an external force 5 from the jacket of the safety strip to the contact elements and as a pivot for contact elements 1, since the switching device must also react to forces or obstacles when they attack the center areas of a contact element 1.

In another configuration of the contact elements, not shown in the drawing, instead of a massive insulating body with a metal filler, one may use insulating disks or plates which are affixed to the ends of the metal pins to save material.

Still another configuration has the contact elements made completely of metal, and the tilt zone arranged on the walls of the tubings. The tilt zones in such a case have the form of beads or nipples running along the inside of the tubing between the contact elements without, however, breaking the contact of the metal pin. In the event the switching device were bent, the contact elements would tilt, not at the edge of the adjacent element, but in the tubing bead lying between.

A further alternative is to have the contact elements not symmetrical, but are formed asymmetrically when viewed in axial section. In such an alternative embodiment, the contact zones would not be arranged in the tubing section plane, but rather, may, for example, comprise noncylindrical, flat contact elements parallel to the safety strip. It is further possible to permit the contact pin to protrude on one side and to have a depression on the other side for the metal pin of the adjacent contact element.

According to a further alternative embodiment, it is possible to have not only two, but three or more contact elements protruding through the tubing pieces and similarly contact those inbetween through the axial pressing together of the outermost contact elements.

I claim:

1. A safety strip for controlling motion of a movable device comprising:

an elongate switching device supported along a forward edge of the movable device, said switching device comprising a plurality of contact elements contacting each other end-to-end along a length of the safety strip by guide means and being pressed together along the safety strip by axial prestressing, each of said contact elements having contact zones which, within a particular contact element, are connected electrically conductively and in an off-state provide electrical contact with adjoining ones of the contact elements on each side of the particular contact element, said electrical contact is separable when the switching device is bent out of shape by external pressure, the prestressing being brought about by tubing pieces overlapping two adjacent of the contact elements in alternating sequence, stressing the contact zones of overlapping ones of the contact zones pressing against each other.

2. The safety strip according to claim 1 wherein the tubing pieces are plugged on said contact elements.

3. The safety strip according to under claim 1 wherein the tubing pieces are connected to the contact elements by screwing connection.

4. The safety strip according to claim 1 wherein the tubing pieces and said contact elements are directly screwed to each other and at least one of the contact elements and the tubing pieces at least has a thread.

5. The safety strip according to claim 1 wherein the contact elements do not have electrically conductive tilt-zones on which the contact elements are tilted against each other in an event that the safety strip is bent, whereby contact of the contact zones between said adjacent contact elements is interrupted.

6. The safety strip of claim 5 wherein the non-electrically conducting tilt zones (8) are arranged in an area (9) of the contact elements (1) that has larger outer dimensions with reference to a longitudinal axis of the safety strip.

7. The safety strip of claim 5 wherein the contact zones (3) and their electrically conducting connection (4) comprise a metal pin (4).

8. The safety strip of claim 5 wherein the contact zones and the electrically conducting connection comprise small diameter metal tubes.

9. The safety strip of claim 1 wherein connections between the tubing pieces and the contact elements are axially close to a center of each of the contact elements.

10. The safety strip of claim 1 wherein connections between the tubing pieces and the contact elements are adjacent to ends of the contact elements.

11. The safety strip of claim 1 wherein the contact elements are formed in one piece and are of a conducting material and a non-electrically conducting tilt zone is positioned in the safety strip.

12. The safety strip of claim 1 wherein the contact elements and the tubing pieces have, in an axial direction, local enlargements of outer dimensions to maintain a predetermined distance to a control unit and to an outer jacket of the safety strip.

* * * * *